United States Patent [19]
Barber

[11] Patent Number: 6,029,692
[45] Date of Patent: Feb. 29, 2000

[54] POSITION CHANGEABLE VALVE HANDLE ASSEMBLY

[75] Inventor: Patrick P. Barber, Kinnelon, N.J.

[73] Assignee: Parker Hannifin Corporation, Ohio

[21] Appl. No.: 09/243,057

[22] Filed: Feb. 2, 1999

[51] Int. Cl.⁷ .................................................. F16K 31/60
[52] U.S. Cl. ........................................... 137/270; 251/288
[58] Field of Search .................................. 137/271, 269, 137/270; 251/288

[56] References Cited

U.S. PATENT DOCUMENTS

| | | | |
|---|---|---|---|
| 3,089,505 | 5/1963 | Forster | 137/270 |
| 4,470,429 | 9/1984 | Johnson | 137/270 |
| 4,559,966 | 12/1985 | Massey et al. | |
| 4,747,427 | 5/1988 | Smith et al. | |
| 4,876,766 | 10/1989 | Cohen | |
| 4,901,749 | 2/1990 | Hutto | |
| 4,909,275 | 3/1990 | Massey et al. | |
| 4,944,325 | 7/1990 | Baldwin et al. | |
| 5,072,913 | 12/1991 | Carroll et al. | |
| 5,647,389 | 7/1997 | Holloway | |

*Primary Examiner*—Kevin Lee
*Attorney, Agent, or Firm*—Anthony J. Casella; Gerald E. Hespos

[57] ABSTRACT

A valve includes a valve stem that is rotatable through 90° for opening and closing the valve. A lever sleeve is securely mounted to the exterior end of the valve stem, and includes at least one pair of diametrically opposite threaded apertures. An indicator cap includes a side wall that is mountable over the lever sleeve. The side wall includes an aperture. The indicator cap is mounted on the sleeve such that the aperture aligns with a selected one of the threaded apertures in the lever sleeve. A handle then is passed through the aperture in the indicator cap and is engaged in the threaded aperture of the lever sleeve for selectively rotating the valve stem. If an obstacle near the valve restricts rotation of the handle, the handle is removed, the indicator cap is rotated 180° and the handle is positioned in the diametrically opposite threaded aperture of the lever sleeve.

20 Claims, 4 Drawing Sheets

POSITION CHANGEABLE VALVE HANDLE ASSEMBLY

BACKGROUND OF THE INVENTION

1. Field of the Invention

The subject invention relates to manual quarter-turn valves intended primarily for ultra high purity gas flow systems.

2. Description of the Related Art

Many industries, such as the semi-conductor industry, require certain manufacturing processes to be carried out in the presence of a specified gas. Additionally, several different types of gas may be required at different locations or at different times in such a manufacturing facility. As a result, such manufacturing facilities include complex arrays of pipes that extend from the respective sources of gas to locations where the gases are required.

Manually operated quarter-turn diaphragm valves are disposed along these complex arrays of pipes for selectively starting and stopping the flows of different gases. The typical prior art manual quarter-turn diaphragm valve includes a valve housing having a valve chamber therein. An inlet extends from a first external location into the valve chamber, and an outlet extends from the valve chamber to a second external location. Portions of the inlet extending into the valve housing are axially aligned with portions of outlet extending from the valve housing. Thus, pipes leading into and out of the typical prior art diaphragm valve also will be axially aligned with one another.

A resiliently deflectable diaphragm is mounted across the valve chamber. The diaphragm can be deflected between a closed condition, where the diaphragm seals the inlet, and an open condition, where the diaphragm is spaced from the inlet. The prior art valve further includes an elongate valve stem that is orthogonal to the axially aligned portions inlet and outlet. The valve stem includes an inner end, an outer end and an intermediate portion that is threadedly engaged in the valve housing. A 90° rotation of the valve stem causes the inner end of the valve stem to deflect the diaphragm between the fully opened condition and the fully closed condition.

A manual quarter-turn diaphragm valve includes an elongate handle that extends orthogonally from the outer end of the valve stem. The handle is secured to the valve stem to be parallel with the inlet and outlet when the valve is fully open, and to be orthogonal to the inlet and outlet when the valve is fully closed. Many prior art valves include a pointed projection that extends oppositely from the handle. The pointed projection and the handle effectively function as a directional arrow that indicates the opened or closed condition of the valve. Thus, technicians know that a valve is opened when the handle and the pointer are aligned with the inlet and outlet. Conversely, technicians know that a valve is closed when the handle and the pointer are aligned orthogonally to the inlet and outlet. This relative position of the handle and the pointer can be visually observed quickly and from a distance.

Many prior art valves are provided with visually apparent indicia to indicate the type of gas flowing through the valve. The indicia may include colors, words or chemical symbols to identify the gas. The gas-identifying indicia on prior art valves is very useful. However, the requirement for such indicia can complicate the management of inventory. Engineers and technicians must ensure that they maintain and/or order valves with the proper indicia for use each time a gas flow system is reconfigured or each time a valve is removed for repair or replacement.

Valves frequently must be placed close to one another or close to some other structure in a manufacturing facility. The proximity between a valve and some other structure can impede the ability to rotate the valve handle. More particularly, the valve handle must be sufficiently large to be easily gripped. However, a handle dimensioned for convenient manual gripping may be too large to be rotated 90° within the limited available space. This problem can be overcome by replacing the valve with a new valve that has a reversed handle. However, significant cost and time are required to replace the affected valve.

The above-described problems associated with efficient rotation of a valve handle have been recognized in the prior art. For example, U.S. Pat. No. 5,647,389 shows a ball valve with an indexable latching handle assembly which permits the arc of operation to be oriented as necessary to avoid surrounding obstacles and thereby to ease operation. The valve of U.S. Pat. No. 5,647,389 includes a complex plurality of plates mounted over the valve stem for achieving any of a plurality of different orientations for the 90° movement of the handle that is required to open or close the ball valve. The repositioned handle will not provide a visual indication of the relative opened or closed condition of the valve.

U.S. Pat. No. 4,559,966 relates to a ball valve that has a handle with a plurality of notches. A detent passes through a selected notch in the handle to engage fixed stops on the valve housing. By moving the detent to a different notch on the valve handle, the range of rotational movement of the handle can be varied.

U.S. Pat. No. 4,747,427 shows a ball valve with a locking plate having stops separated by 90°. The plate can be inverted to change the permissible ranges of movement of the valve.

The above-described prior art relates to ball valves. The valve stem of a ball valve does not move axially into or out of the valving housing, but merely rotates. Additionally, the valving member of the ball valve has two fully opened conditions separated from one another by 180° and two fully closed conditions separated from one another by 180°. Thus, repositioning the handle on a ball valve can be carried out fairly easily by merely changing the end of the opening through the ball that will function as the inlet and/or by changing the direction of rotation between the opened and closed conditions. A diaphragm valve presents additional complications because the valve stem has only one fully opened position and one fully closed position which are separated by 90°.

Conventional sinks and exterior faucets are valves with manually activated valve stems. It often is desirable to position the handle on such a valve stem to achieve a specified aesthetic appeal. For example, it may be desirable to have handles on a conventional sink faucet facing away from one another and away from a centrally disposed spigot. Alternatively, some outdoor faucets may have an ornamental handle that desirably is aligned axially with the faucet. Handles of this type often include a cap that simply is telescoped over the valve stem. The cap can be rotated independently of the valve stem into a selected aesthetically desired orientation. The prior art cap includes a set screw extending radially therethrough. The set screw can be tightened against the valve stem to achieve a selected rotational orientation. An example of such a handle is shown in U.S. Pat. No. 4,876,766. Handles of this type can slip rotationally relative to the valve stem. Such slippage would have a minor aesthetic impact in a typical household environment, but would create no significant problem in the functioning of the household valve. However, misalignment of a handle in an industrial valve for a high purity gas flow can have a major impact on an industrial process. Hence, a handle as shown in U.S. Pat. No. 4,876,766 is not acceptable for high purity gas flows.

SUMMARY OF THE INVENTION

The subject invention is directed to a valve with a position changeable handle that enables the handle to be orientated for efficient movement through 90° from a fully opened condition to a fully closed position. The valve may be a diaphragm valve and includes a valve body having a chamber. An inlet extends from a first external position into the chamber and an outlet extends from the chamber to a second external position. Portions of the inlet and outlet that extend to the first and second external positions preferably are aligned axially with one another.

A diaphragm may be secured across the valve chamber by a bonnet and a bonnet nut. Threaded tightening of the bonnet nut onto the valve housing will tightly urge the bonnet against peripheral regions of the diaphragm for securely holding the diaphragm against portions of the valve body surrounding the chamber.

A valve stem that is threadedly engaged in the bonnet. The valve stem includes an inner end disposed adjacent the diaphragm and an outer end disposed externally of the bonnet. The valve stem and the bonnet are configured to permit a maximum of 90° of rotation of the valve stem. Rotation of the valve stem in a first direction causes the inner end of the valve stem to deflect the diaphragm inwardly into tight sealing engagement around the inlet to the valve. Rotation of the valve stem in the opposed direction permits the diaphragm to be deflected away from the inlet.

The valve may include an indicator plate with "open" and "closed" indicia spaced from one another by 90°. The indicator plate can be fastened to the bonnet nut and around the valve stem in either of at least first and second rotational orientations.

A lever sleeve is non-rotatably secured to the outer end of the valve stem such that the longitudinal axes of the valve stem and the lever sleeve are coincident. The lever sleeve may be generally cylindrical and includes at least two opposed threaded apertures that may be aligned along a diameter of the lever sleeve. An elongate lever is provided and has a threaded end that is engageable in a selected one of the threaded apertures of the lever sleeve.

The valve further includes an indicator cap having a closed top end, an opened bottom end and a generally tubular sidewall extending therebetween. Thus, a cavity is defined within the tubular sidewall and extends from the opened bottom toward the closed top. The cavity is dimensioned to telescope over the lever sleeve. A portion of the sidewall is formed with an aperture that is dimensioned to receive the threaded portion of the lever therein. The indicator cap further includes a directional indicator at a location diametrically opposite the aperture.

The valve handle is assembled by rotating the valve stem into the open position. The lever sleeve then is non-rotatably secured to the outer end of the valve stem such that two diametrically aligned threaded apertures in the lever sleeve are parallel to the inlet and outlet. The indicator cap then is telescoped over the lever sleeve such that the aperture through the side wall of the indicator cap aligns with a threaded aperture in the lever sleeve. The lever then is passed through the aperture in the indicator cap and is threaded into the lever sleeve. In this position, the lever and the directional indicator on the indicator cap align with the inlet and outlet to indicate that fluid can flow through the valve. Rotation of the lever 90° causes the valve stem to rotate into the valve housing and deflects the diaphragm into tight sealing engagement with portions of the valve housing surrounding the inlet to the valve chamber. In this position, the lever and the directional indicator on the indicator cap will define an arrow pointing orthogonally to the axially aligned inlet and outlet of the valve. Thus, the lever and the directional indicator on the cap provide a clear indication that the valve is closed to prevent a gas flow therethrough.

As noted above, other structures installed in the industrial facility may impede the ability to rotate the lever 90° between the fully open condition and the fully closed condition. In these situations, technicians at the industrial facility need merely unthread the lever from the lever sleeve and rotate the indicator cap 180°. The set screw that holds the indicator plate in position then is loosened, and the indicator plate is rotated 180° relative to the valve housing. The indicator plate then is tightened, and the lever is threaded into the aperture of the lever sleeve that is diametrically opposite the initial lever position. As a result, the lever and the directional indicator on the indicator cap will continue to align with the inlet and outlet when the valve is opened and will be orthogonal to the inlet and outlet when the valve is closed. However, the lever will be in a diametrically opposite position for both of these ranges of movement, thereby enabling the valve to function efficiently despite any structural interference that might otherwise exist.

DETAILED DESCRIPTION OF THE PREFERRED EMBODIMENT

Figure 1:
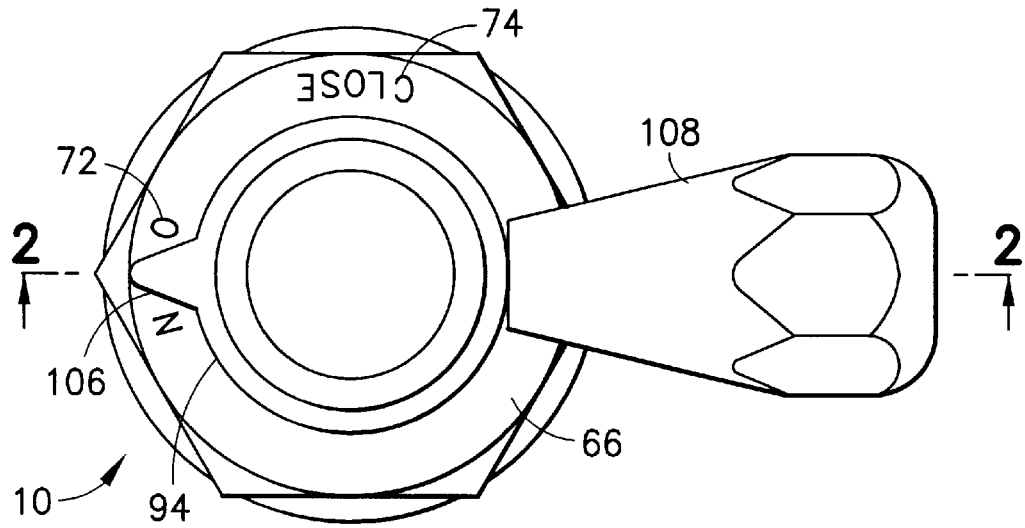
FIG. 1 is a top plan view of a valve in accordance with the subject invention.
Figure 2:
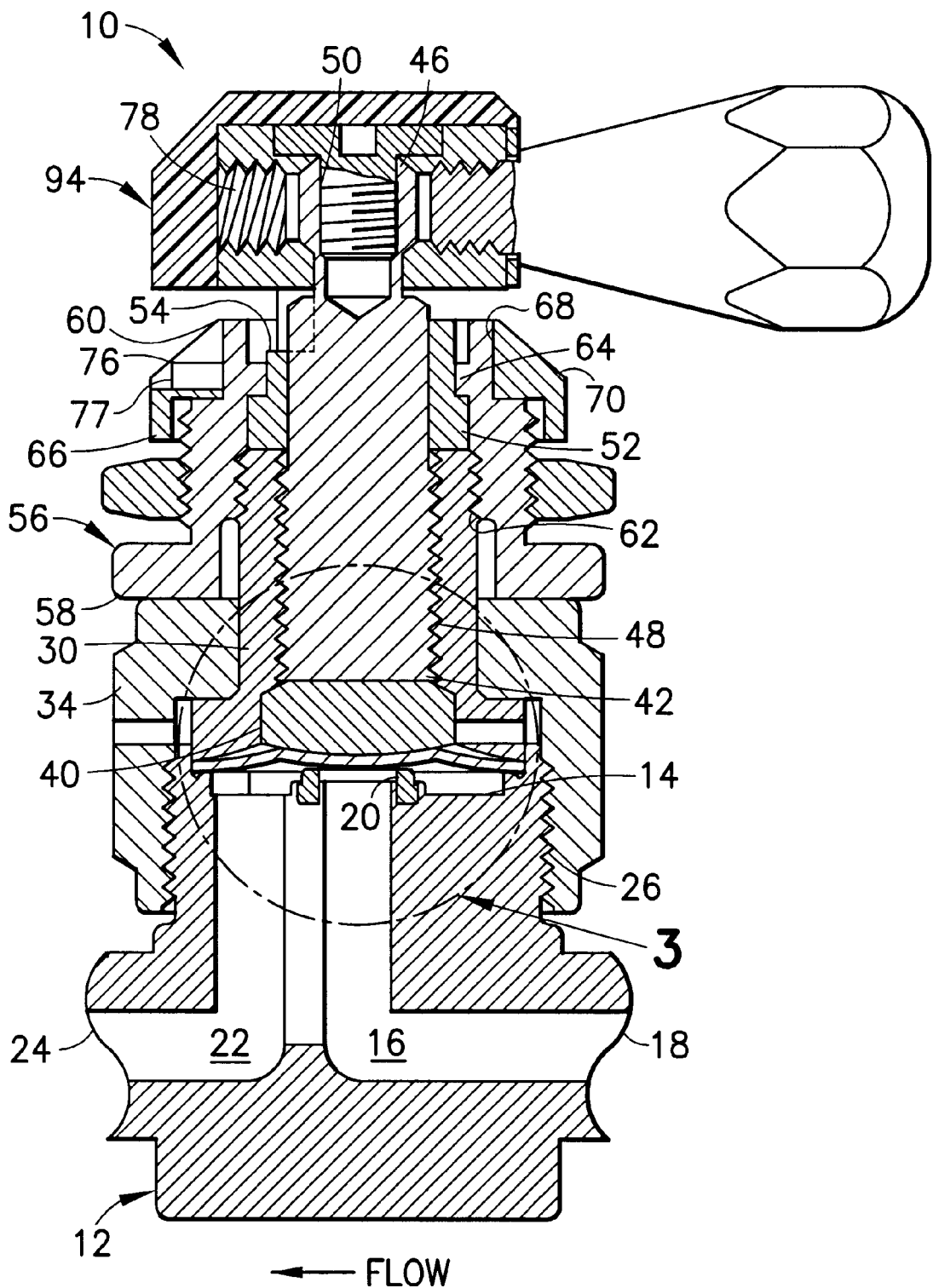
FIG. 2 is a cross-sectional view taken along line 2—2 in FIG. 1.

A valve in accordance with the subject is identified generally by the numeral 10 in FIGS. 1 and 2. The valve 10 includes a housing 12 formed with a valve chamber 14. An inlet 16 of the valve housing 12 extends from a first external location 18 to the valve chamber 14. Portions of the valve housing 12 that surround the entrance of the inlet 16 into the valve chamber 14 define a toroidal valve seat 20. An outlet 22 extends through the valve housing 12 from the chamber 14 to a second external location 24. Portions of the inlet 16 adjacent the first external location 18 are axially aligned with portions of the outlet 22 adjacent the second external location 24. The valve housing 12 is characterized further by an array of external threads 26 that concentrically surround the valve chamber 14.

Figure 3:
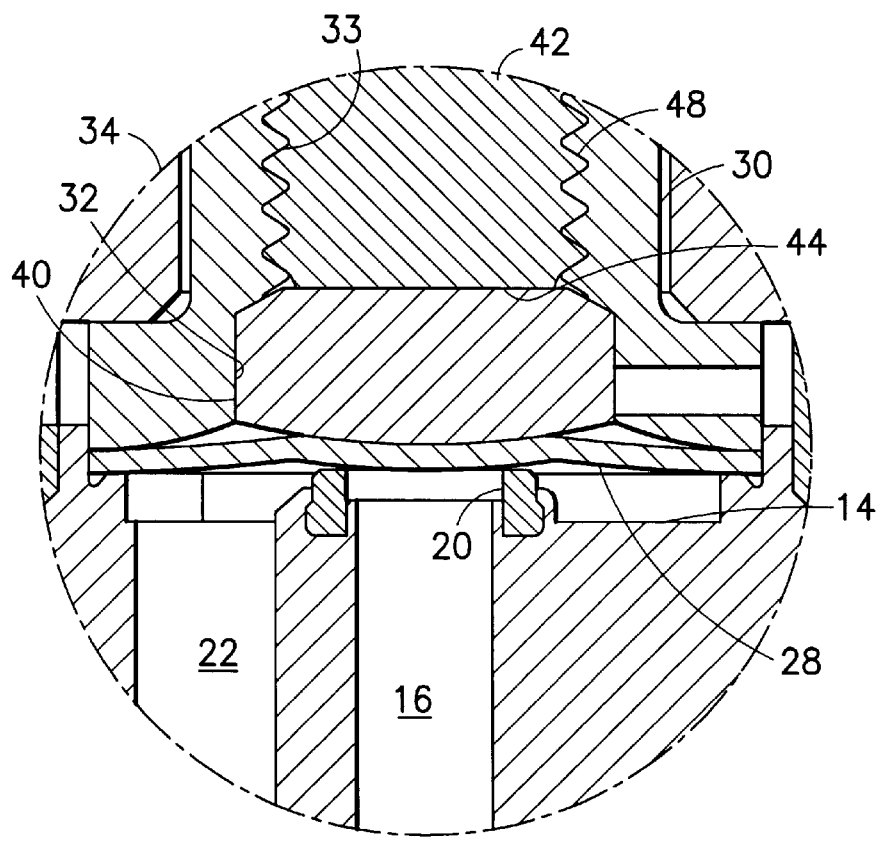
FIG. 3 is an enlarged cross-sectional view of a portion of the valve shown in FIG. 2.

A circular diaphragm 28 has peripheral regions mounted to portions of the valve housing 12 that surround the chamber 14, as shown in FIG. 3. Thus central regions of the diaphragm extend across and cover the valve chamber 14. In an unbiased condition, the diaphragm 28 is spaced from the toroidal valve seat 20. However, the diaphragm 28 is deflectable into tight sealing engagement with the valve seat 20.

A bonnet 30 is mounted over the peripheral regions of the diaphragm 28, such that the peripheral regions of the diaphragm 28 are disposed between the bonnet 30 and the valve housing 12. The bonnet 30 further is provided with a central aperture 32 that is registered with portions of the inlet 16 that extend into the valve chamber 14. A portion 33 of the aperture 32 through the bonnet 30 is threaded.

A bonnet nut 34 is provided with an array of internal threads 36 which engage the threads 26 on the valve housing 12. The bonnet nut 34 further includes an inwardly directed shoulder 38 which engages portions of the bonnet 30 that register with the peripheral regions of the diaphragm 28. Thus, threaded tightening of the bonnet nut 34 tightly urges the bonnet 30 against the peripheral regions of the diaphragm 28 for sealing the valve chamber 14.

An actuator button 40 is slidably positioned in the central aperture 32 of the bonnet 30 and has a lower convex surface that engages the central region of the diaphragm 28. Axial movement of the actuator button 40 relative to the bonnet 30 will deflect the diaphragm 28 into tight sealing engagement with the valve seat 20.

An elongate valve stem 42 is formed with a lower end 44, an upper end 46 and an array of external threads 48 therebetween. The threads 48 of the valve stem 42 are engaged with the threaded portion 33 of the aperture 32 through the bonnet 30. The lower end 44 of the valve stem 42 is disposed in abutting engagement with the upper surface of the actuator button 40. The upper end 46 of the valve stem 42 extends upwardly beyond the bonnet 30 as explained further below. The upper end 46 is characterized by a central threaded aperture 50 extending therein. Rotation of the valve stem 42 relative to the bonnet 30 will generate axial movement of the valve stem 42 toward or away from the valve housing 12. Movement of the valve stem 42 toward the valve housing 12 will cause the actuator button 40 to slide axially within the bonnet 30 for deflecting the diaphragm 28 tightly against the valve seat 20. Conversely, movement of the valve stem 42 away from the valve housing 12 will permit the diaphragm 28 to resiliently return to an undeflected condition in which the diaphragm 28 is spaced from the valve seat 20.

A gland 52 surrounds unthreaded portions of the valve stem 42. Upper and outer portions of the gland 52 define a notch 54 that extends through an arc of substantially 90° about the gland 52. The 90° notch 54 in the gland 52 defines the maximum permissible range of motion of the valve stem 42 during movement between the fully opened and closed positions.

The valve 10 further includes a lock nut 56 having a lower end 58, an upper end 60 and an array of internal threads 62 for engaging the bonnet 30. Outer circumferential regions of the lock nut 56 adjacent the upper end 60 define an unthreaded exterior surface. A ledge 64 extends inwardly near the upper end 60, and is dimensioned to urge the gland 52 tightly against the bonnet 30.

An indicator plate 66 includes an axially aligned through aperture 68 that is dimensioned to telescope over the unthreaded upper end 60 of the lock nut 56. The indicator plate 66 is provided with an upwardly and outwardly facing tapered surface 70 having "open" and "close" indicia 72 and 74 thereon that are separated from one another by 90° as shown in FIG. 1. The indicator plate 66 further includes a radially aligned threaded aperture 76 for receiving a set screw 77 to lock the indicator plate 66 in a selected rotational alignment relative to the lock nut 56.

Figure 4:
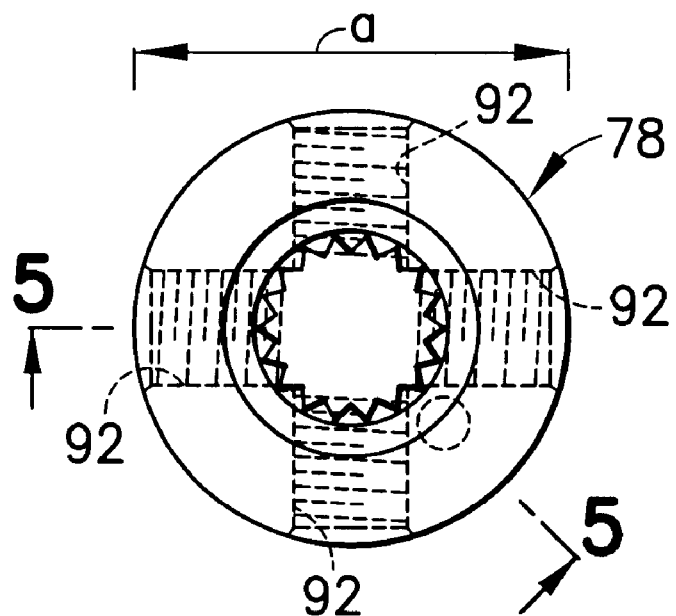
FIG. 4 is a top plan view of the lever sleeve of the valve.
Figure 5:
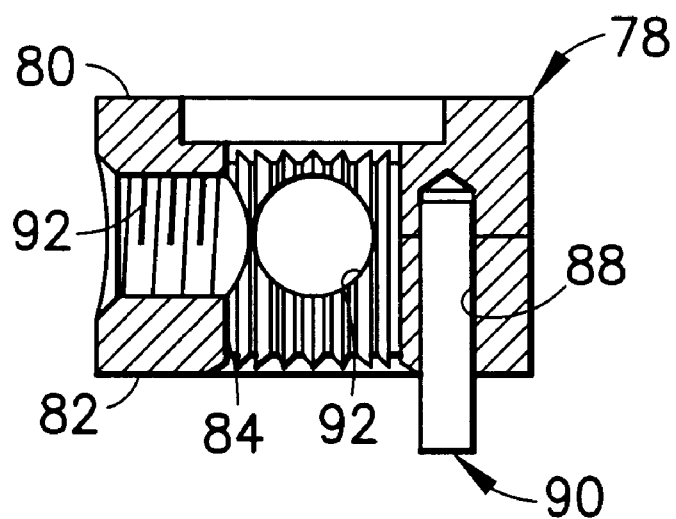
FIG. 5 is a cross-sectional view taken along line 5—5 in FIG. 4.

The valve 10 further includes a lever sleeve 78 having opposed top and bottom ends 80 and 82 and a central aperture 84 extending therebetween, as shown in FIGS. 4 and 5. The central aperture 84 is configured for non-rotational engagement over the top end 46 of the valve stem 42. In the embodiment depicted herein, the central aperture 84 of the lever sleeve 78 is formed with a plurality of circumferentially-spaced axially-aligned splines that engage corresponding splines on the valve stem 42. The top end 80 of the lever sleeve 78 includes a central recess surrounding the aperture 84. The recess is dimensioned to receive the head of a lock screw that is threadedly engaged in the central aperture 50 at the top end 46 of the valve stem 42. Thus, the lock screw positively holds the lever sleeve 78 in a selected non-rotational position on the top end 46 of the valve stem 42. The bottom end 82 of the lever sleeve 78 includes a pin aperture 88 aligned parallel to the axis of the lever sleeve 78. The pin aperture 88 is dimensioned to receive a pin 90 that is press fit therein. The pin 90 extends sufficiently below the bottom end 82 of the lever sleeve 78 for engagement in the 90° notch 54 in the gland 52. Thus, the pin 90 and the notch 54 cooperate with one another for limiting the rotational movement of the valve stem 42 to 90°.

In this embodiment, the lever sleeve 78 is substantially cylindrical and is formed with an outer circumferential surface of radius "a". Four radially aligned threaded apertures 92 extend from the outer circumferential surface of the lever sleeve 78 into communication with the central aperture 84. The radial aligned threaded apertures 92 are spaced 90° from one another such that alternating apertures are disposed in diametrically opposite positions on the lever sleeve 78 and in alignment with one another.

Figure 6:
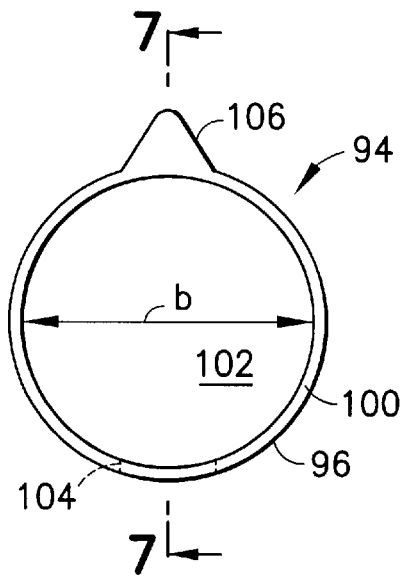
FIG. 6 is a bottom plan view of the indicator cap.
Figure 7:
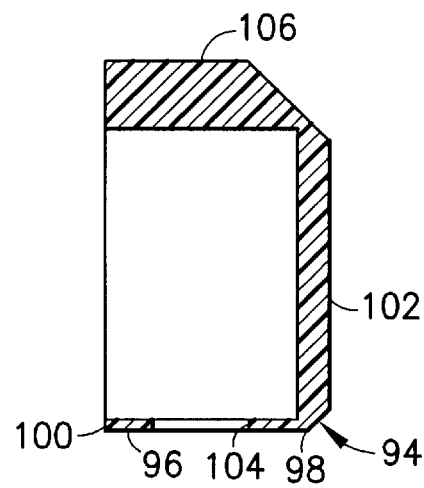
FIG. 7 is a cross-sectional view taken along line 7—7 in FIG. 6.
Figure 8:
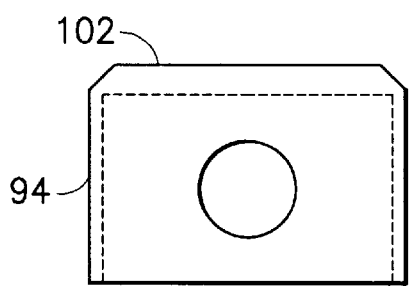
FIG. 8 is a side elevational view of the indicator cap.

The valve 10 further includes an indicator cap 94 that is unitarily molded from plastic to define a tubular sidewall 96 with opposed top and bottom ends 98 and 100, as shown in FIGS. 6–8. A top wall 102 extends continuously across the top end 98 of the sidewall 96 and may be molded with indicia to identify the manufacturer of the valve or the type of gas flowing through the valve. The bottom end 100 of the sidewall 96 is substantially completely open, and is dimensioned and configured to be telescoped over the lever sleeve 78. Thus, for the illustrated embodiment, the sidewall 96 is cylindrical and defines an inside diameter "b" that is substantially equal to or slightly greater than the outside diameter "a" defined by the lever sleeve 78. The plastic of the indicator cap 94 may be of a color that is indicative of the type of gas flowing through the valve 10.

The cylindrical side wall 96 of the indicator cap 94 is characterized by a circular aperture 104 extending radially therethrough. The indicator cap 94 further includes an arrow 106 that projects radially outwardly from the sidewall 96 at a location diametrically opposite the aperture 104.

Figure 9:
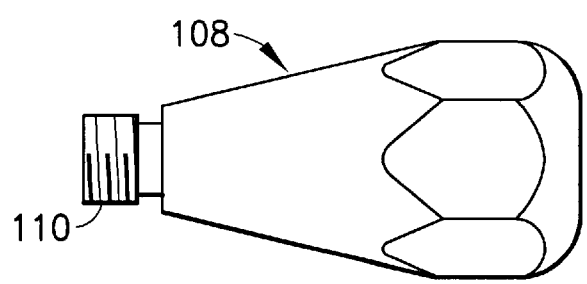
FIG. 9 is a side elevational view of the lever of the valve shown in FIG. 2.

The valve 10 further includes an elongate handle 108 as shown in FIG. 9. The handle 108 has a threaded end 110 that is dimensioned to pass through the aperture 104 in the indicator cap for threaded engagement in a selected one of the radially aligned threaded apertures 92 of the lever sleeve 78.

The valve housing 12, diaphragm 28, bonnet 30, bonnet nut 34 and valve stem 42 are assembled substantially in a conventional manner for prior art diaphragm valves. The lock nut 56 then is threaded over the bonnet 30 with the gland 52 secured between the lock nut 56 and the top end of the bonnet 30. The gland 52 is positioned such that one end of the 90° notch 54 therein is substantially aligned in a plane passing through diameters of the inlet 16, outlet 22 and valve stem 42. The opposed end of the notch 54 then will be 90° offset from the plane passing through the centers of the inlet 16 and outlet 22.

The indicator plate 66 then is telescoped over the upper end 60 of the lock nut 56. The indicator plate 66 is rotated until the "open" indicia 72 aligns with the plane passing through the centers of the inlet 16 and outlet 22. The set screw 76 then is tightened to secure the indicator plate 66 in this position.

The lever sleeve 78 then is telescoped over the top end 46 of the valve stem 42 such that a pair of diametrically opposite apertures 92 align with the plane passing centrally through the inlet 16 and outlet 22. The lock screw 86 then is threaded into the aperture 50 in the top end 46 of the valve stem 42 for securely holding the lever sleeve 78 on the valve stem 42.

The indicator cap 94 then is telescoped over the lever sleeve 78 such that the arrow 106 aligns with the open indicia 72. The threaded end 110 of the handle 108 then is passed through the aperture 104 in the indicator cap 94 and is threaded into the corresponding radially aligned aperture 92 of the lever sleeve 78. In this condition, the handle 108 and the arrow 106 are aligned with the "open" indicia 72 and are further aligned with the entry 18 and exit 24 to and from the valve housing 12 to indicate an open condition of the valve 10.

The valve 10 can be used in a conventional manner merely by applying a torque to the handle 108 for rotating the valve stem 42 90° to the fully closed position. In the fully closed position, the actuator button 40 will deform the diaphragm 28 into sealing engagement with the valve seat 20. Additionally, in this condition, the arrow 106 will point to the "closed" indicia 74 and the combination of the arrow 106 and the handle 108 will be aligned orthogonally to the entry 18 and exit 24 of the valve housing 12 to provide a clear indication that the valve 10 is in its closed condition.

As noted above, conditions in the facility employing the valve 10 may change in a manner that prevents the handle 108 from conveniently rotating the required 90° from the fully opened condition to the fully closed condition and back again. In this situation, it merely is necessary to unthread the end 110 of the handle 108 from the radially aligned aperture 92 in the lever sleeve 78. The indicator cap then is rotated 180°, and the handle 108 then is threaded back into the aperture 92 that is diametrically opposite the aperture in which the handle 108 had been engaged initially. The set screw 76 then is loosened and the indicator plate 66 similarly is rotated through 180°. The set screw 76 then is retightened. As reconfigured, the arrow 106 will continue to indicate both the opened and closed condition in both rotational extremes of the handle 108. These changes can be carried out very easily without disassembling operative portions of the valve 10 and without replacing the valve 10 in a pipe system. Hence, it is unnecessary to undergo cleaning or purging operations that might be required if interior portions of an ultra high purity fluid flow system were exposed by the disassembly or disconnection of a valve.

While the invention has been described with respect to certain preferred embodiments, it is apparent that various changes can be made without departing from the scope of the invention as defined by the appended claims. In particular, the lever sleeve could be formed with only two diametrically opposed apertures 92 rather than the four apertures 92 illustrated herein. Additionally, differently configured mechanisms for deflecting the diaphragm can be provided. For example, a tied diaphragm can be provided in which the diaphragm normally is in a closed position and is pulled upwardly by the valve stem. Additionally, although only one valve has been illustrated, the invention may comprise a system of valves with different indicator caps in the system having different colors from one another in accordance with the type of gas to flow through the valve. These and other changes will be apparent to a person skilled in the art after having read the subject disclosure.

What is claimed is:

1. A position changeable handle assembly for a quarter-turn valve, said valve having a valve body and a valve stem rotatably movable through 90° relative to the valve body, said valve stem having an end disposed externally of the valve body, said handle assembly comprising:

a sleeve configured and dimensioned for non-rotatable mounting over the end of the valve stem, the sleeve having at least first and second diametrically opposite handle mounting structures thereon;

an indicator cap removably mounted over the sleeve in a selected one of at least first and second positions, said indicator cap including an opening disposed for registration with the first handle mounting structure when the indicator cap is in the first position and for registration with the second handle mounting structure when the indicator cap is in the second position; and a handle selectively engageable with the handle mounting structures on said sleeve and being engaged with the handle mounting structure that is registered with said opening of said indicator cap, whereby said handle is mounted to a selected handle mounting structure on the sleeve for permitting 90° rotation of the sleeve and the indicator cap.

2. The handle assembly of claim 1, wherein a handle mounting structure of the sleeve comprises at least a pair of diametrically opposite threaded apertures formed therein, said handle having a threaded end dimensioned for engagement in a selected one of said threaded apertures of said sleeve.

3. The handle assembly of claim 2, wherein said sleeve is substantially cylindrical, said threaded apertures being aligned along radii of the cylindrical sleeve.

4. The handle assembly of claim 3, wherein the sleeve includes a central aperture dimensioned and configured for non-rotatable engagement over the end of the valve stem.

5. The handle assembly of claim 4, wherein the valve stem includes a threaded aperture extending axially into the end thereof, the handle assembly further including a lock screw having a threaded portion dimensioned and configured for engagement in the threaded aperture of the valve stem and a head lockingly engaged with a selected portion of the sleeve.

6. The handle assembly of claim 2, wherein the sleeve includes four threaded apertures separated from one another by 90°.

7. The handle assembly of claim 2, wherein the indicator cap includes a substantially cylindrical sidewall dimensioned for telescoped engagement over the sleeve, the opening including an aperture in the sidewall, the aperture being dimensioned for registration with a selected one of the threaded apertures in the sleeve.

8. The handle assembly of claim 1, further comprising an indicator plate disposed substantially adjacent the sleeve, the indicator plate including structure for mounting to the valve body in a selected rotational orientation, the indicator plate including opened and closed indicia formed thereon and spaced from one another by 90°, whereby the indicator plate is selectively mountable to the valve body in positions relative to the handle for the opened and closed indicia to identify opened and closed conditions of the handle.

9. The handle assembly of claim 1, wherein the valve body includes an inlet and an outlet, the inlet including a portion entering the valve body, the outlet including a portion leaving the valve body, portions of the inlet and outlet entering and leaving the valve body being substantially coaxial, the sleeve being selectively mountable on the valve stem such that in the open condition of the valve, the handle mounting structure of the sleeve extends parallel to the coaxial portions of the inlet and outlet.

10. The handle assembly of claim 1, wherein the indicator cap includes an arrow diametrically opposite the opening therein.

11. A quarter-turn valve, said valve comprising:
a valve body;
a valve stem rotatably movable through 90° relative to the valve body, said valve stem having an end disposed externally of the valve body;
a sleeve non-rotatably secured to the end of the valve stem, the sleeve having at least first and second diametrically opposite handle mounting structures thereon;
an indicator cap removably mounted over the sleeve in a selected one of at least first and second positions, said indicator cap including an opening disposed for registration with the first handle mounting structure when the indicator cap is in the first position and for registration with the second handle mounting structure when the indicator cap is in the second position; and
a handle selectively engageable with the handle mounting structures on said sleeve and being mounted to the handle mounting structure that is registered with said opening of said indicator cap, whereby said handle is mounted to a selected handle mounting structure on the sleeve for permitting 90° rotation of the handle, the sleeve and the valve stem.

12. The valve of claim 11, wherein a handle mounting structure of the sleeve comprises at least a pair of diametrically opposite threaded apertures formed therein, said handle having a threaded end dimensioned for engagement in a selected one of said threaded apertures of said sleeve.

13. The valve of claim 12, wherein said sleeve is substantially cylindrical, said threaded apertures being aligned along radii of the cylindrical sleeve.

14. The valve of claim 13, wherein the sleeve includes a central aperture dimensioned and configured for non-rotatable engagement over the end of the valve stem.

15. The valve of claim 14, wherein the valve stem includes a threaded aperture extending axially into the end thereof, the valve further including a lock screw having a threaded portion engaged in the threaded aperture of the valve stem and a head lockingly engaged with a selected portion of the sleeve.

16. The valve of claim 12, wherein the sleeve includes four threaded apertures separated from one another by 90°.

17. The valve of claim 12, wherein the indicator cap includes a substantially cylindrical sidewall dimensioned for telescoped engagement over the sleeve, the opening including an aperture in the sidewall, the aperture being dimensioned for registration with a selected one of the threaded apertures in the sleeve.

18. The valve of claim 11, further comprising an indicator plate surrounding portions of the valve substantially adjacent the sleeve, the indicator plate being rotatable relative to the valve and being lockable in a selected rotational orientation, the indicator plate including opened and closed indicia formed thereon and spaced from one another by 90°, whereby the indicator plate is selectively lockable in positions relative to the handle for the opened and closed indicia to identify opened and closed conditions of the valve.

19. The valve of claim 11, wherein the valve body includes an inlet and an outlet, the inlet including a portion entering the valve body, the outlet including a portion leaving the valve body, portions of the inlet and outlet entering and leaving the valve body being substantially coaxial, the sleeve being selectively mountable on the valve stem such that in the open condition of the valve, the handle mounting structure of the sleeve extends parallel to the coaxial portions of the inlet and outlet, the indicator cap having a arrow formed thereon at a location diametrically opposite the opening.

20. A position changeable handle assembly for a quarter-turn valve, said assembly comprising:
a generally cylindrical sleeve having a non-cylindrical aperture extending axially therethrough, the sleeve having at least first and second diametrically opposite handle mounting structures thereon;
an indicator cap having a cylindrical sidewall slidably mounted over said sleeve and movable between at least first and second positions on said sleeve, said indicator cap including an opening extending through said cylindrical sidewall thereof, said opening being dimensioned and disposed for registration with the first handle mounting structure when the indicator cap is in the first position on the sleeve and being disposed for registration with the second handle mounting structure when the indicator cap is in the second position on the sleeve, the cylindrical sidewall having an arrow at a location diametrically opposite the opening; and
a handle removably engaged with the handle mounting structure that is registered with the opening.

* * * * *